Figure 1:
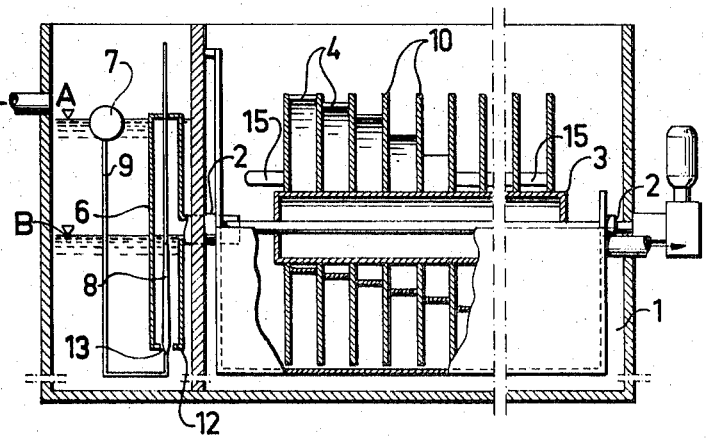

United States Patent

[11] 3,613,890

| [72] | Inventor | Ake Oscar Wilhelm Hellqvist |
| | | Djurhamn, Sweden |
| [21] | Appl. No. | 856,559 |
| [22] | Filed | Sept. 10, 1969 |
| [45] | Patented | Oct. 19, 1971 |
| [73] | Assignee | AB Gustavsbergs Fabriker |
| | | Gustavsberg, Sweden |
| [32] | Priority | Sept. 11, 1968 |
| [33] | | Sweden |
| [31] | | 12191/68 |

[54] APPARATUS FOR BIOLOGICALLY PURIFYING SEWAGE
3 Claims, 3 Drawing Figs.

| [52] | U.S. Cl. | 210/150, 261/92 |
| [51] | Int. Cl. | B01d 21/00 |
| [50] | Field of Search | 210/150, 151; 261/92 |

[56] References Cited
UNITED STATES PATENTS

| 1,811,181 | 6/1931 | Maltby | 210/150 |
| 2,106,025 | 1/1938 | Faber | 261/92 |
| 2,223,227 | 11/1940 | Robic | 261/92 |
| 2,586,692 | 2/1952 | Morel | 210/150 X |
| 3,266,786 | 8/1966 | Grimes et al. | 261/92 |
| 3,305,224 | 2/1967 | Piotrowski | 261/92 |
| 3,335,081 | 8/1967 | El-Naggar | 210/151 X |

FOREIGN PATENTS

| 451,031 | 5/1968 | Sweden |

*Primary Examiner*—John Adee
*Attorney*—McGlew and Toren

ABSTRACT: There is provided an apparatus for biologically purifying sewage from which the sludge has been removed. The apparatus causes a reduction of nitrogen in the sewage with the aid of aerobic micro-organisms and includes a trough with an inlet and an outlet and in which is arranged a rotor with a plurality of plates with vanes arranged between the plates which vanes are angularly displaced in relation to each other.

PATENTED OCT 19 1971　　3,613,890

INVENTOR
AKE OSCAR WILHELM HELLQVIST
BY: McGlew and Toren
ATTORNEYS

APPARATUS FOR BIOLOGICALLY PURIFYING SEWAGE

The present invention relates to an apparatus for biologically purifying sewage, particularly sewage from which the sludge has been removed. More specifically the invention relates to an apparatus for aerating sewage to cause a reduction of nitrogen in the sewage (oxidation of the ammonification products ammoniumoxidation) with the aid of aerobic microorganisms.

The apparatus of the invention is of the type which includes a trough or open tank having a sewage inlet and outlet and in which is arranged a rotor comprising a horizontal shaft having disposed thereon a plurality of circular plates which extend partially down into the sewage running through the tank. The apparatus is mainly characterized in that vanes which present an essentially circularly curved shape are arranged between the plates, each vane being eccentrically arranged so that one end thereof is closer to the periphery of the plates than the other end and preferably so that both ends of the vane lie on the same diametral line, and in that the vanes are successively angularly displaced in relation to each other.

A number of advantages are gained by means of the present invention. For instance, the rotor of the apparatus of the invention obtains a larger active surface than a rotor without vanes. The eccentric positioning of the vanes causes the air which at a certain position of a vane becomes trapped beneath the blade to be forced in towards the shaft of the rotor, thereby obtaining a high degree of aeration, even with respect to the sewage located nearest the rotor shaft. When using apparatuses of this type which are not provided with vanes, difficulties are experienced in the form of anaerobic fermentation of the sewage located in this region. Finally, the successive angular displacement of the vanes affords a well-balanced rotor and causes the sewage to be propelled through the tank.

Figure 2:
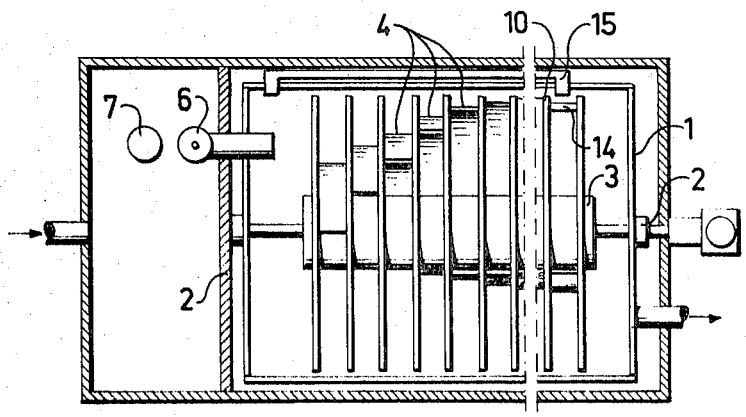
Figure 3:
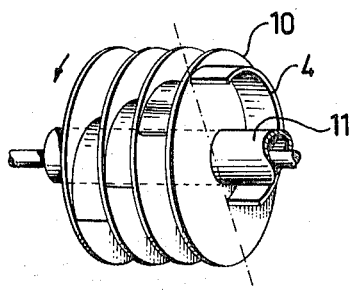

The invention will now be described in more detail with reference to the accompanying drawing, in which FIG. 1 is a central, vertical section through an apparatus constructed in accordance with the invention, FIG. 2 is a plan view of the apparatus shown in FIG. 1, and FIG. 3 shows a portion of the rotor in the apparatus of FIGS. 1 and 2.

The apparatus illustrated in the drawing comprises a stationary portion and a movable portion. The stationary portion comprises a horizontal trough or tank 1 having covered semicircular end walls and a curved bottom. The movable portion comprises a rotor 3, whose horizontal shaft 11 is supported in bearings 2 mounted in the upper portion of the tank end walls. A motor, (not shown), preferably an electric motor, is arranged to rotate the rotor slowly about its axis.

The rotor 3 is suitably made in one piece, preferably of a plastic material, and comprises the shaft 11 and a plurality of circular plates 10 arranged on the shaft. Arranged between the plates 10 are vanes 4, the vanes having an essentially circularly curved shape. Each vane is eccentrically arranged, so that one end thereof is located nearer the periphery of the plates 10 than its other end. The ends of the vanes lie on the same diametral 5.

The vanes 4 are successively displaced angularly of each other, as will best be seen from FIG. 3. This provides for a well-balanced rotor. Furthermore, the angular displacement of the vanes causes the sewage to be propelled through the tank, in a manner whereby the sewage displaced by one vane is urged towards the adjacent vane. The direction of rotation of the rotor is illustrated by an arrow in FIG. 3. The rotor 3 rotates so that the ends of the vanes 4 situated nearest the periphery of the circular plates 10 constantly lie first in the direction of movement.

During operation, the plates 10 are immersed into the sewage, which upon rotation of said plates is lifted in thin layers into the ambient air. A layer of micro-organism which bring about a biochemical aerobic process is formed on the rotor surfaces. As the sewage contacts this layer of micro-organisms, it undergoes an extensive reduction of organic material, coliphorma and other pathogenic bacteria etc., provided that sufficient oxygen is supplied to the microbic layer.

The eccentric orientation of the vanes 10 causes air to be forced in towards the rotor shaft, thereby assuring that the sewage located close to the shaft is also subjected to an aerobic process, despite the fact that the agitation is less effective in this area than at the periphery of the rotor.

The flow of sewage to the apparatus is normally irregular. In order to equalize the flow, the incoming sewage is passed through a valve means 6-9, which includes a T-tube 6, the lower opening of which has an inwardly extending flange 12. Arranged in the tube 6 is an upwardly tapering valve body 8 which presents at the bottom thereof a chamfered surface 13. The valve body 8 is connected via a rod 9 to a float 7, which floats on the surface A of the sewage surrounding the tube 6.

When the level of the sewage rises over the normal level B, the valve body 8 is lifted, thereby reducing the opening defined by the flange 12 and maintaining a substantially uniform flow of sewage to the tank. If, however, the high level A is exceeded, the lower chamfered surface 13 of the valve body will increase the opening defined by the flange 12, thereby increasing the flow to the tank 1. Thus all sewage enters through the bottom of tube 6, thus obviating the use of a spillway, which is desirable in view of the fact that surface sludge is often present on the surface of the sewage and that the introduction of this sludge into the tank is undesirable.

Arranged between the last two circular plates 10 are one or two scoops 14, which collect a small quantity of the purified liquid and empty it, via a feedback line 15, back to the inlet end of the tank, thereby supplying to the tank a small quantity of oxygenated water.

What is claimed is:

1. An apparatus for biologically purifying sewage, comprising a tank having a sewage inlet and an outlet for the treated sewage, a rotor rotatably mounted in said tank for rotation about a substantially horizontal axis and having a shaft portion, a plurality of generally circular plate portions arranged in axially spaced relationship along said shaft portion and secured to said shaft portion for rotation therewith, and a vane portion arranged between adjacent plate portions and eccentrically positioned in respect to said plate portions and connected to said shaft portion for rotation therewith, the respective opposite extremities of said plate portions lying on the same diameter line which extends through the center of said shaft portion, axially adjacent vanes being circumferentially offset proceeding in an axial direction from one end of said rotor in a direction opposite to the direction of rotation of said rotor.

2. An apparatus for biologically purifying sewage and being of the type which includes a sewage receiving tank, agitating means mounted within said tank, means for actuating the agitating means, means for feeding sewage to the tank and means for removing the purified liquid, the agitating means comprising a rotor journaled for rotation in said tank and including a shaft, a plurality of sewage actuating plates, arranged in axially spaced locations along said shaft and concentrically affixed thereto for rotation therewith, a vane member arranged between axially adjacent plates, said vane members of axially adjacent plates being angularly displaced in relation to each other and eccentrically arranged in respect to said plates and being connected to said plates for rotation therewith and with said shaft, the ends of each vane lying on the same diametral, means for transferring a small quantity, of the purified, oxygenated liquid to the inlet end of said tank, and means adapted to rotate the rotor in a determined direction of rotation.

3. An apparatus according to claim 2, wherein said oxygenated liquid transfer means are in the form of at least one scoop mounted on the leading vane member and adapted to transfer the liquid back to the inlet end of the tank via a return line coacting between the scoop and said inlet end.